(12) United States Patent
Hughes et al.

(10) Patent No.: US 12,264,264 B2
(45) Date of Patent: *Apr. 1, 2025

(54) COATING COMPOSITION

(71) Applicant: ARMSTRONG WORLD INDUSTRIES INC., Lancaster, PA (US)

(72) Inventors: John E Hughes, Lincoln University, PA (US); Suzanne M Huntzinger, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,844

(22) Filed: May 10, 2023

(65) Prior Publication Data

US 2023/0279245 A1   Sep. 7, 2023

Related U.S. Application Data

(62) Division of application No. 16/991,566, filed on Aug. 12, 2020, now Pat. No. 11,685,837.

(60) Provisional application No. 62/885,430, filed on Aug. 12, 2019.

(51) Int. Cl.
| | | |
|---|---|---|
| C09D 7/62 | (2018.01) | |
| C08K 13/06 | (2006.01) | |
| C09D 131/04 | (2006.01) | |
| C09D 133/08 | (2006.01) | |

(52) U.S. Cl.
CPC .............. *C09D 7/62* (2018.01); *C09D 131/04* (2013.01); *C09D 133/08* (2013.01); *C08K 13/06* (2013.01)

(58) Field of Classification Search
CPC ....................................................... C09D 7/62
See application file for complete search history.

(56) References Cited

U.S. PATENT DOCUMENTS

| | | |
|---|---|---|
| 3,862,066 A | 1/1975 | Reiter |
| 5,112,402 A | 5/1992 | Freeman |
| 5,312,484 A | 5/1994 | Kaliski |
| 9,410,289 B2 | 8/2016 | Ahlgren |
| 2004/0062898 A1 | 4/2004 | Felegi, Jr. |
| 2009/0192252 A1 | 7/2009 | Stration |
| 2015/0252198 A1 | 9/2015 | Sulzer |
| 2017/0165636 A1 | 6/2017 | Caldwell |

FOREIGN PATENT DOCUMENTS

| | | |
|---|---|---|
| CA | 1074481 A | 3/1980 |
| EP | 3505576 A1 | 7/2019 |
| WO | WO 97/02323 | 1/1997 |
| WO | WO 03/029560 | 4/2003 |
| WO | WO 2006/083348 A2 | 8/2006 |
| WO | WO 2018/005827 A1 | 1/2018 |
| WO | WO 2019/067010 A1 | 4/2019 |

*Primary Examiner* — Wenwen Cai
(74) *Attorney, Agent, or Firm* — Patrick Sheldrake

(57) ABSTRACT

Described herein is a building panel comprising a body having a first major surface opposite a second major surface and a side surface extending therebetween, a coating applied to at least one of the first major surface, the second major surface, or the side surface, the coating comprising a binder, and a pigment composition comprising titanium dioxide, an alkali metal silicate, and a clay; wherein the titanium dioxide is present in an amount ranging from about 3.0 wt. % to about 15.0 wt. % based on the total weight of the pigment composition.

7 Claims, 3 Drawing Sheets

COATING COMPOSITION

CROSS-REFERENCE TO RELATED APPLICATIONS

This application is a divisional of U.S. patent application Ser. No. 16/991,566, filed on Aug. 12, 2020, which claims the benefit of U.S. Provisional Application No. 62/885,430, filed on Aug. 12, 2019. The disclosure of each of the above application is incorporated herein by reference in its entirety for all purposes.

BACKGROUND

Interior building materials may be required to meet various visual characteristics to match a desired room aesthetic. Coatings may be applied to various building surfaces to provide such visual characteristics—including color and/or light reflectance. However, previous attempts at formulating such coating compositions required relatively large amounts of certain pigments—thereby increasing the material cost. While more economical options may exist, such coatings fail to provide the desired visual characteristics to the resulting coated surface. Therefore, the need exists for a high-performance coating that achieves the desired visual characteristics with a decreased material cost.

BRIEF SUMMARY

Some embodiments of the present invention include a building panel comprising: a body having a first major surface opposite a second major surface and a side surface extending therebetween; a coating applied to at least one of the first major surface, the second major surface, or the side surface, the coating comprising: a binder; and a pigment composition comprising titanium dioxide; an alkali metal silicate; and a clay; wherein the titanium dioxide is present in an amount ranging from about 3.0 wt. % to about 15.0 wt. % based on the total weight of the pigment composition.

Other embodiments of the present invention include a building panel comprising: a body having a first major surface opposite a second major surface and a side surface extending there-between; a coating applied to at least one of the first major surface, the second major surface, or the side surface, the coating comprising: a binder; and a pigment composition comprising titanium dioxide; an alkali metal silicate; calcined kaolin; calcium carbonate; and magnesium carbonate; wherein the pigment composition is present in an amount ranging from about 65.0 wt. % to about 95.0 wt. % based on the total weight of the coating, and wherein the coating is substantially free of liquid carrier.

Other embodiments of the present invention include a coating composition comprising: a liquid carrier; a binder; and a pigment composition comprising titanium dioxide; an alkali metal silicate; and a clay; wherein the titanium dioxide is present in an amount ranging from about 2.0 wt. % to about 12.0 wt. % based on the total weight of the pigment composition.

Other embodiments of the present invention include a coating composition comprising: a liquid carrier; a binder; and a pigment composition comprising titanium dioxide; an alkali metal silicate; calcined kaolin; magnesium carbonate; and calcium carbonate; wherein the pigment composition is present in an amount ranging from about 55.0 wt. % to about 75.0 wt. % based on the total weight of the coating composition.

Other embodiments of the present invention include a building panel comprising: a body having a first major surface opposite a second major surface and a side surface extending there-between; a coating applied to at least one of the first major surface, the second major surface, or the side surface, the coating comprising: a binder; and a pigment composition comprising titanium dioxide; an alkali metal silicate; and wherein the titanium dioxide is present in an amount ranging from about 3.0 wt. % to about 15.0 wt. % based on the total weight of the pigment composition.

Other embodiments of the present invention include a coating composition comprising: a liquid carrier; a binder; and a pigment composition comprising titanium dioxide; an alkali metal silicate; and wherein the titanium dioxide is present in an amount ranging from about 2.0 wt. % to about 12.0 wt. % based on the total weight of the pigment composition.

Other embodiments of the present invention include a method of forming a building panel comprising a) applying one of the aforementioned coating compositions to a first major surface of a substrate; and b) drying the coating composition so that substantially all of the liquid carrier is removed from the coating composition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
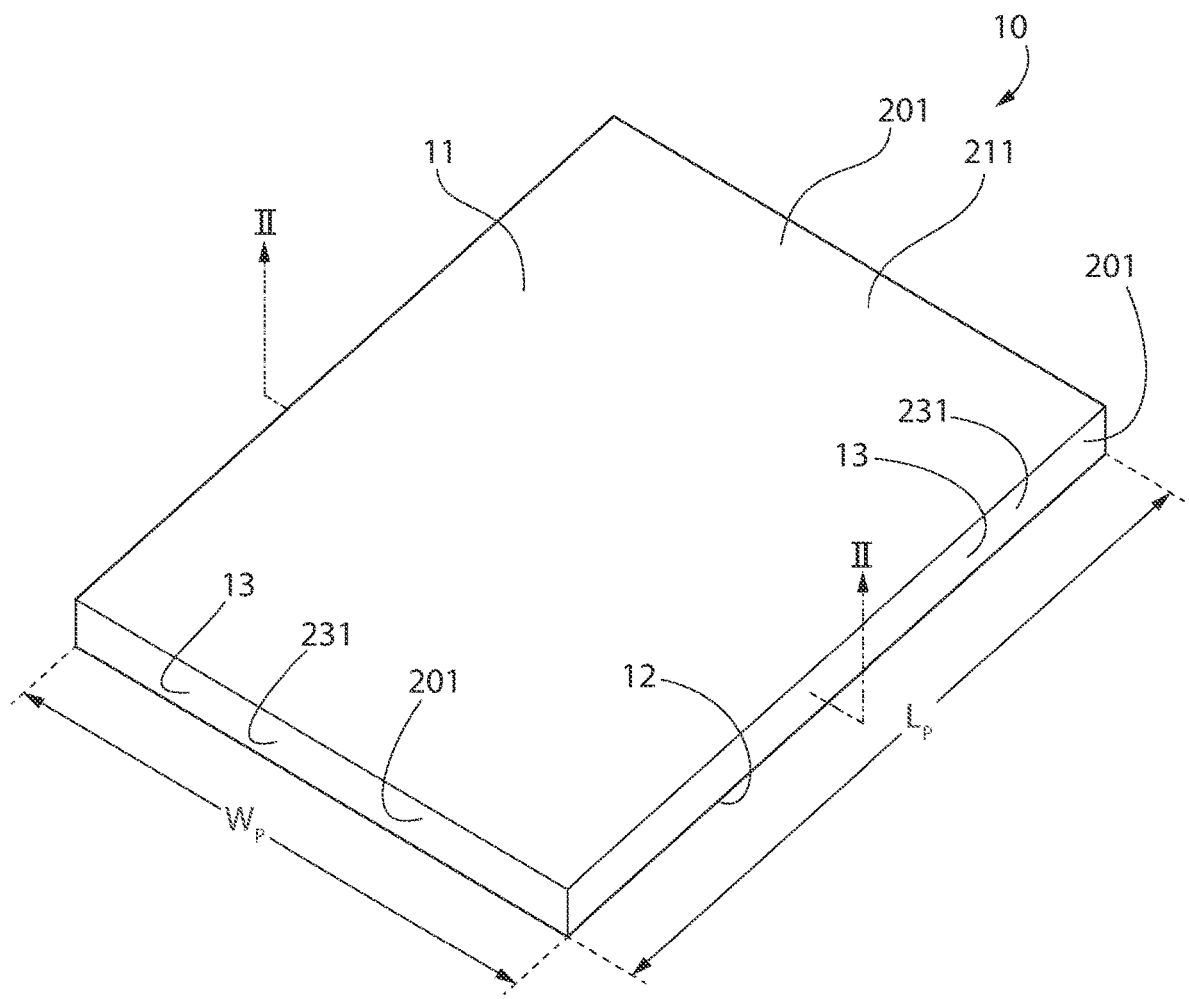
FIG. 1 is top perspective view of a building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Referring to FIG. 1, the present invention includes a building panel 10 comprising a first major exposed surface 11 opposite a second major exposed surface 12 and a side exposed surface 13 that extends between the first major exposed surface 11 and the second major exposed surface 12, thereby defining a perimeter of the ceiling panel 10.

Figure 3:
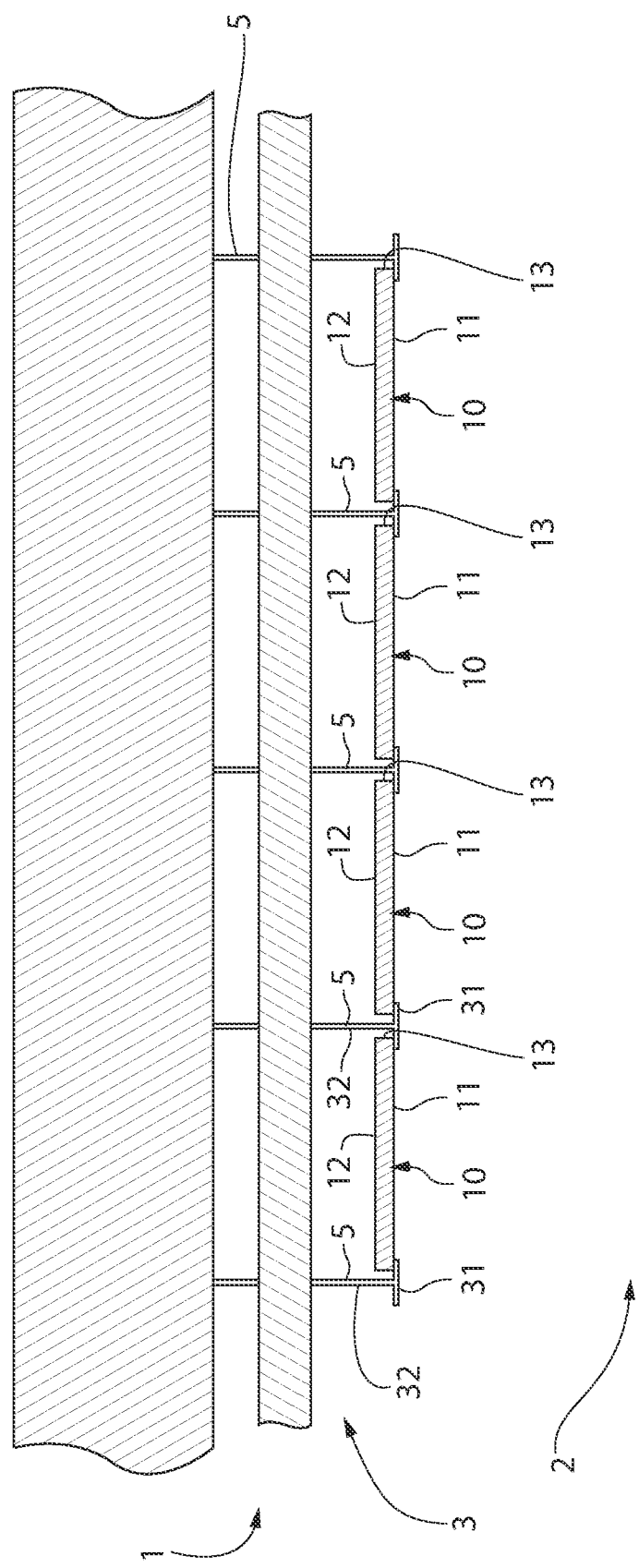
FIG. 3 is a ceiling system comprising the building panel of the present invention.

Referring to FIG. 3, the present invention may further include a ceiling system 1 comprising one or more of the building panels 10 installed in an interior space, whereby the interior space comprises a plenum space 3 and an active room environment 2. In such embodiments, the building panel 10 may be referenced as a ceiling panel 10. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 10 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid. The plenum space 3 exists above the ceiling support grid 6 and the active room environment 2 exists below the ceiling support grid 6. In the installed state, the first major exposed surface 11 of the building panel 10 may face the active room environment 2 and the second major exposed surface 12 of the building panel 10 may face the plenum space 3.

Figure 2:
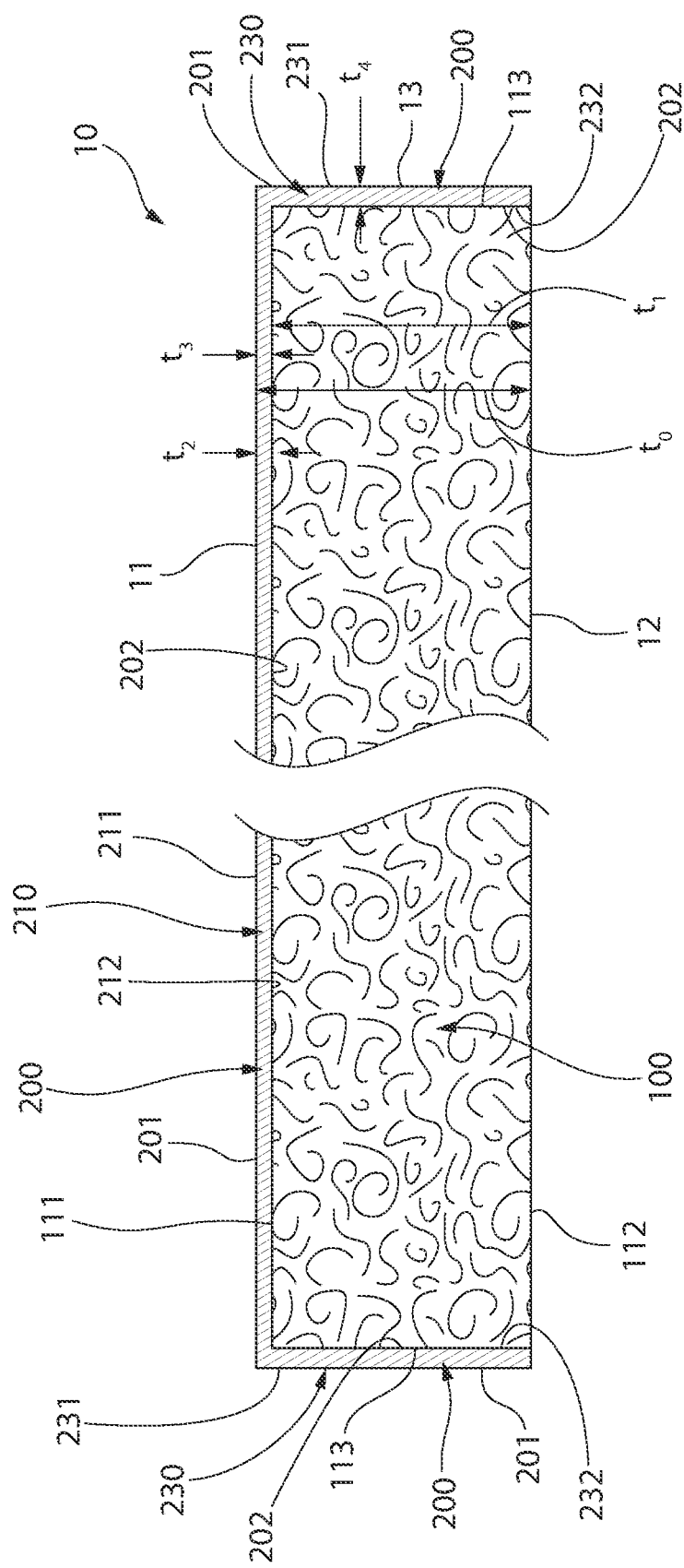
FIG. 2 is a cross-sectional view of the building panel according to the present invention, the cross-sectional view being along the II line set forth in FIG. 1.

Referring now to FIGS. 1 and 2, the building panel 10 of the present invention may have a panel thickness to as measured from the first major exposed surface 11 to the second major exposed surface 12. The panel thickness to may range from about 12 mm to about 40 mm—including all values and sub-ranges there-between. The building panel 10 may have a length LP ranging from about 30 cm to about 310 cm—including all values and sub-ranges there-between. The building panel 100 may have a width WP ranging from about 10 cm to about 125 cm—including all values and sub-ranges there-between.

The building panel 10 may comprise a body 100 and a surface coating 200 applied thereto—as discussed further herein. The body 100 comprises an upper surface 111 opposite a lower surface 112 and a body side surface 113 that extends between the upper surface 111 and the lower surface 112, thereby defining a perimeter of the body 100. The body 100 may have a body thickness $t_1$ that as measured by the distance between the upper surface 111 to the lower surface 112 of the body 100. The body thickness $t_1$ may range from about 12 mm to about 40 mm—including all values and sub-ranges there-between.

The body 100 may be porous, thereby allowing airflow through the body 100 between the upper surface 111 and the lower surface 122—as discussed further herein. The body 100 may be comprised of a binder and fibers. In some embodiments, the body 100 may further comprise a filler and/or additive.

Non-limiting examples of binder may include a starch-based polymer, polyvinyl alcohol (PVOH), a latex, polysaccharide polymers, cellulosic polymers, protein solution polymers, an acrylic polymer, polymaleic anhydride, epoxy resins, or a combination of two or more thereof. Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof.

The porosity of the body 100 may allow for airflow through the body 100 under atmospheric conditions such that the building panel 10 may function as an acoustic building panel—specifically, an acoustic ceiling panel 10, which requires properties related to noise reduction and sound attenuation properties—as discussed further herein.

Specifically, the body 100 of the present invention may have a porosity ranging from about 60% to about 98%—including all values and sub-ranges there between. In a preferred embodiment, the body 100 has a porosity ranging from about 75% to 95%—including all values and sub-ranges there between. According to the present invention, porosity refers to the following:

$$\% \text{ Porosity} = [V_{Total} - (V_{Binder} + V_F + V_{Filler})]/V_{Total}$$

Where $V_{Total}$ refers to the total volume of the body 100 defined by the upper surface 111, the lower surface 112, and the body side surfaces 113. $V_{Binder}$ refers to the total volume occupied by the binder in the body 100. $V_F$ refers to the total volume occupied by the fibers in the body 100. $V_{Filler}$ refers to the total volume occupied by the filler in the body 100. $V_{HC}$ refers to the total volume occupied by the hydrophobic component in the body 100. Thus, the % porosity represents the amount of free volume within the body 100.

The building panel 10 of the present invention comprising the body 100 may exhibit sufficient airflow for the building panel 10 to have the ability to reduce the amount of reflected sound in a room. The reduction in amount of reflected sound in a room is expressed by a Noise Reduction Coefficient (NRC) rating as described in American Society for Testing and Materials (ASTM) test method C423. This rating is the average of sound absorption coefficients at four ¼octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The building panel 10 of the present invention exhibits an NRC of at least about 0.5. In a preferred embodiment, the building panel 10 of the present invention may have an NRC ranging from about 0.60 to about 0.99—including all value and sub-ranges there-between.

The surface coating 200 of the present invention may be applied to at least one of the upper surface 111 and/or the body side surface 113 of the body 100. In some embodiments, the surface coating 200 of the present invention may be applied directly to at least one of the upper surface 111 and/or the body side surface 113 of the body 100. Although not pictured, in some embodiments, the building panel 10 may further comprise a scrim that is immediately adjacent to the upper surface 111 of the body 100. The scrim may comprise a first major surface opposite a second major surface, whereby the second major surface contacts the upper surface 111 of the body 100. In such embodiments, the surface coating 200 may be applied to the first major surface of the scrim.

The surface coating 200 is formed from a coating composition that may comprise a pigment composition. The coating composition may further comprise a binder. The coating composition may further comprise one or more additives.

The surface coating 200 is present in a dry-state. According to the present invention, the phrase "dry-state" refers to the coating composition being substantially free of a liquid carrier (e.g., liquid water). Thus, the surface coating 200, which is in the dry-state, may comprise the pigment composition, binder, and additive while having less than about 0.1 wt. % of liquid carrier based on the total weight of the surface coating 200. In a preferred embodiment, the surface coating 200 in the dry-state has a solid's content of about 100 wt. % based on the total weight of the surface coating 200.

Conversely, the coating composition may be applied to either the body 100 or a scrim in a "wet-state," which refers to the coating composition containing various amounts of liquid carrier—as discussed further herein. Therefore, in the wet-state, the coating composition may comprise at least liquid carrier and the pigment composition. In some embodiments, the coating composition in the wet-state may comprise liquid carrier, the pigment composition, and binder. In some embodiments, the coating composition in the wet-state may comprise liquid carrier, the pigment composition, binder, and one or more additives. The liquid carrier may be selected from water, VOC solvent—such as acetone, toluene, methyl acetate—or combinations thereof. In a preferred embodiment, the liquid carrier is water and comprises less than 1 wt. % of VOC solvent based on the total weight of the liquid carrier.

In the wet-state, the coating composition may have a solids content ranging from about 50 wt. % to about 85 wt. %—including all amounts and sub-ranges there-between. In some embodiments, the wet-state, the coating composition may have a solids content ranging from about 65 wt. % to about 80 wt. %—including all amounts and sub-ranges there-between. In some embodiments, the coating composition in the wet-state may have a solids content ranging from about 70 wt. % to about 80 wt. %—including all amounts and sub-ranges there-between.

The solid's content is calculated as the fraction of materials present in the coating composition that is not the liquid carrier. Specifically, the solid's content of the coating composition in the wet-state may be calculated as the total amount of the coating composition in the dry-state (i.e., the amount of pigment composition, binder, and additive) and dividing it by the total weight of the coating composition in the wet-state, including liquid carrier.

The liquid-based coating composition may comprise water as the liquid carrier, wherein the liquid carrier comprises less than 1 wt. % of VOC solvent. In the wet-state, the coating composition may exhibit a viscosity ranging from about 9,000 cps to about 17,000 cps as measured by a Brookfield viscometer at 0.5 RPM using a #3 or #4 spindle at room temperature—including all viscosities and sub-ranges there-between. In the wet-state, the coating composition may exhibit a viscosity ranging from about 900 cps to about 1,800 cps as measured by a Brookfield viscometer at 10 RPM using a #2 spindle at room temperature—including all viscosities and sub-ranges there-between. In the wet-state, the coating composition may exhibit a viscosity ranging from about 300 cps to about 700 cps as measured by a Brookfield viscometer at 60 RPM using a #1 or #2 spindle at room temperature—including all viscosities and sub-ranges there-between. In the wet-state, the coating composition may exhibit a viscosity ranging from about 250 cps to about 650 cps as measured by a Brookfield viscometer at 100 RPM using a #1 or #2 spindle at room temperature—including all viscosities and sub-ranges there-between.

The coating composition may exhibit a pH ranging from about 7.0 to about 9.0—including all pH values and sub-ranges there-between. In a preferred embodiment, the coating composition may exhibit a pH ranging from about 7.5 to about 8.5—including all pH values and sub-ranges there-between.

The coating composition may exhibit a density ranging from about 32 kg/l to about 75 kg/l—including all densities and sub-ranges there-between.

The coating composition may comprise the pigment composition in an amount ranging from about 65 wt. % to about 95 wt. %—based on the total weight of coating composition in the dry-state—i.e., as the surface coating 200—including all weight percentages and sub-ranges there-between. In some embodiments, the coating composition may comprise the pigment composition in an amount ranging from about 75 wt. % to about 95 wt. %—based on the total weight of coating composition in the dry-state—i.e., as the surface coating 200—including all weight percentages and sub-ranges there-between. The coating composition may comprise the pigment composition in an amount ranging from about 80 wt. % to about 95 wt. %—based on the total weight of coating composition in the dry-state—i.e., as the surface coating 200—including all weight percentages and sub-ranges there-between. The coating composition may comprise the pigment composition in an amount ranging from about 85 wt. % to about 95 wt. %—based on the total weight of coating composition in the dry-state—i.e., as the surface coating 200—including all weight percentages and sub-ranges there-between.

The coating composition may comprise the pigment composition in an amount ranging from about 55 wt. % to about 80 wt. %—based on the total weight of coating composition in the wet-state—including all weight percentages and sub-ranges there-between. In some embodiments, the coating composition may comprise the pigment composition in an amount ranging from about 60 wt. % to about 75 wt. %—based on the total weight of coating composition in the wet-state—including all weight percentages and sub-ranges there-between.

The pigment composition of the present invention may comprise titanium dioxide and a clay. In some embodiments, the pigment composition of the present invention may comprise titanium dioxide, a clay, and one or more alkaline metal carbonates. In some embodiments, the pigment composition of the present invention may comprise titanium dioxide, a clay, one or more alkaline metal carbonates, and an alkali metal silicate.

The titanium dioxide may be present in an amount ranging from about 3 wt. % to about 15 wt. % based on the total weight of the pigment composition—including all weight percentages and sub-ranges there-between. In some embodiments, the titanium dioxide may be present in an amount ranging from about 5 wt. % to about 10 wt. % based on the total weight of the pigment composition—including all weight percentages and sub-ranges there-between.

The titanium dioxide may be present in an amount ranging from about 2 wt. % to about 15 wt. % based on the total weight of the coating composition in the dry-state—i.e., the surface coating 200—including all weight percentages and sub-ranges there-between. In some embodiments, the titanium dioxide may be present in an amount ranging from about 4 wt. % to about 8 wt. % based on the total weight of the coating composition in the dry-state—i.e., the surface coating 200—including all weight percentages and sub-ranges there-between.

The titanium dioxide may be present in an amount ranging from about 1 wt. % to about 10 wt. % based on the total weight of the coating composition in the wet-state—including all weight percentages and sub-ranges there-between. In some embodiments, the titanium dioxide may be present in an amount ranging from about 3 wt. % to about 6 wt. % based on the total weight of the coating composition in the wet-state—including all weight percentages and sub-ranges there-between.

The titanium dioxide may have an average particle size ranging from about 0.3 μm to about 1.0 μm—including all sizes and sub-ranges there-between.

The clay of the pigment composition may be calcined kaolin (also referred to as kaolinite). Calcined kaolin may be differentiated from raw kaolin in that the calcined kaolin has been converted to a calcined form by thermal processes. Such processes result in a de Hydroxylation of the kaolin and an aggregation of the particles and convert the crystal structure to an amorphous form.

The clay may be present in an amount ranging from about 10 wt. % to about 30 wt. % based on the total weight of the pigment composition—including all weight percentages and sub-ranges there-between. In some embodiments, the clay may be present in an amount ranging from about 15 wt. % to about 25 wt. % based on the total weight of the pigment composition—including all weight percentages and sub-ranges there-between. In some embodiments, the titanium dioxide may be present in an amount ranging from about 17 wt. % to about 23 wt. % based on the total weight of the pigment composition—including all weight percentages and sub-ranges there-between.

The clay may be present in an amount ranging from about 10 wt. % to about 25 wt. % based on the total weight of the coating composition in the dry-state—i.e., the surface coating 200—including all weight percentages and sub-ranges there-between. In some embodiments, the clay may be present in an amount ranging from about 12 wt. % to about 23 wt. % based on the total weight of the coating composition in the dry-state—i.e., the surface coating 200—including all weight percentages and sub-ranges there-between. In some embodiments, the clay may be present in an amount ranging from about 15 wt. % to about 21 wt. % based on the total weight of the coating composition in the dry-state—i.e., the surface coating 200—including all weight percentages and sub-ranges there-between.

The clay may be present in an amount ranging from about 8 wt. % to about 20 wt. % based on the total weight of the coating composition in the wet-state—including all weight percentages and sub-ranges there-between. In some embodiments, the clay may be present in an amount ranging from about 10 wt. % to about 16 wt. % based on the total weight of the coating composition in the wet-state—including all weight percentages and sub-ranges there-between.

The alkaline metal carbonate may be present in the pigment composition in an amount ranging from about 60 wt. % to about 80 wt. %—based on the total weight of the pigment composition—including all amounts and sub-ranges there-between. The alkaline metal carbonate may include at least one of calcium carbonate and magnesium carbonate. In some embodiments, the alkaline metal carbonate may comprise both calcium carbonate and magnesium carbonate. The calcium carbonate and the magnesium carbonate may be present in a weight ratio ranging from about 3:1 to about 6:1—including all ratios and sub-ranges there-between. In some embodiments, the calcium carbonate and the magnesium carbonate may be present in a weight ratio ranging from about 4:1 to about 5:1—including all ratios and sub-ranges there-between.

The magnesium carbonate may be present in an amount ranging from about 8 wt. % to about 20 wt. % based on the total weight of the pigment composition—including all weight percentages and sub-ranges there-between. In some embodiments, the magnesium carbonate may be present in an amount ranging from about 10 wt. % to about 18 wt. % based on the total weight of the pigment composition—including all weight percentages and sub-ranges there-between. In some embodiments, the magnesium carbonate may be present in an amount ranging from about 12 wt. % to about 15 wt. % based on the total weight of the pigment composition—including all weight percentages and sub-ranges there-between.

The magnesium carbonate may be present in an amount ranging from about 8 wt. % to about 18 wt. % based on the total weight of the coating composition in the dry-state—i.e., the surface coating—including all weight percentages and sub-ranges there-between. In some embodiments, the magnesium carbonate may be present in an amount ranging from about 10 wt. % to about 15 wt. % based on the total weight of the coating composition in the dry-state—i.e., the surface coating 200—including all weight percentages and sub-ranges there-between.

The magnesium carbonate may be present in an amount ranging from about 6 wt. % to about 12 wt. % based on the total weight of the coating composition in the wet-state—including all weight percentages and sub-ranges there-between. In some embodiments, the magnesium carbonate may be present in an amount ranging from about 8 wt. % to about 11 wt. % based on the total weight of the coating composition in the wet-state—i.e., the surface coating 200—including all weight percentages and sub-ranges there-between.

The calcium carbonate may be present in an amount ranging from about 45 wt. % to about 70 wt. % based on the total weight of the pigment composition—including all weight percentages and sub-ranges there-between. In some embodiments, the calcium carbonate may be present in an amount ranging from about 50 wt. % to about 65 wt. % based on the total weight of the pigment composition—including all weight percentages and sub-ranges there-between. In some embodiments, the calcium carbonate may be present in an amount ranging from about 55 wt. % to about 65 wt. % based on the total weight of the pigment composition—including all weight percentages and sub-ranges there-between.

The calcium carbonate may be present in an amount ranging from about 40 wt. % to about 65 wt. % based on the total weight of the coating composition in the dry-state—i.e., the surface coating 200—including all weight percentages and sub-ranges there-between. In some embodiments, the calcium carbonate may be present in an amount ranging from about 50 wt. % to about 60 wt. % based on the total weight of the coating composition in the dry-state—i.e., the surface coating 200—including all weight percentages and sub-ranges there-between.

The calcium carbonate may be present in an amount ranging from about 30 wt. % to about 50 wt. % based on the total weight of the coating composition in the wet-state—including all weight percentages and sub-ranges there-between. In some embodiments, the calcium carbonate may be present in an amount ranging from about 35 wt. % to about 45 wt. % based on the total weight of the coating composition in the wet-state—including all weight percentages and sub-ranges there-between.

The calcium carbonate may have an average particle size ranging from about 0.5 μm to about 40 μm—including all sizes and sub-ranges there-between.

The alkali metal silicate of the pigment composition may include at least one compound where the alkali moiety is selected from sodium, potassium, lithium, and combinations thereof. The alkali metal silicate of the pigment composition may include at least one compound where the metal silicate is selected from aluminum silicate, magnesium silicate, calcium silicate, and combinations thereof. In a preferred embodiment, the alkali metal silicate may include sodium aluminum silicate.

The clay and the alkali metal silicate may be present in a weight ratio ranging from about 8:1 to about 30:1—including all ratios and sub-ranges there-between. In a non-limiting embodiment, the clay and the alkali metal silicate may be present in a weight ratio ranging from about 8:1 to about 10:1—including all ratios and sub-ranges there-between. In a non-limiting embodiment, the clay and the alkali metal silicate may be present in a weight ratio ranging from about 13:1 to about 16:1—including all ratios and sub-ranges there-between. In a non-limiting embodiment, the clay and the alkali metal silicate may be present in a weight ratio ranging from about 27:1 to about 30:1—including all ratios and sub-ranges there-between.

The alkali metal silicate may be present in an amount ranging from about 0.3 wt. % to about 3.0 wt. % based on the total weight of the pigment composition—including all weight percentages and sub-ranges there-between. In some embodiments, the alkali metal silicate may be present in an amount ranging from about 0.5 wt. % to about 2.5 wt. % based on the total weight of the pigment composition—including all weight percentages and sub-ranges there-between.

The alkali metal silicate may be present in an amount ranging from about 0.3 wt. % to about 2.5 wt. % based on the total weight of the coating composition in the dry-state—i.e., the surface coating 200—including all weight percentages and sub-ranges there-between. In some embodiments, the alkali metal silicate may be present in an amount ranging from about 0.5 wt. % to about 2.2 wt. % based on the total weight of the coating composition in the dry-state—i.e., the surface coating 200—including all weight percentages and sub-ranges there-between.

The alkali metal silicate may be present in an amount ranging from about 0.2 wt. % to about 2.0 wt. % based on the total weight of the coating composition in the wet-state—including all weight percentages and sub-ranges there-between. In some embodiments, the alkali metal silicate may be present in an amount ranging from about 0.4 wt. % to about 1.6 wt. % based on the total weight of the coating composition in the wet-state—i.e., the surface coating 200—including all weight percentages and sub-ranges there-between.

The alkali metal silicate may have an average particle size ranging from about 0.5 μm to about 20 μm—including all sizes and sub-ranges there-between.

The surface coating 200 may comprise one or more binders. The binder may be polymeric. The binder may have a glass transition temperature ("Tg") that ranges from about −5° C. to about 60° C.—including all temperatures and sub-ranges there-between. In some embodiments, the binder may have a Tg that ranges from about 20° C. to about 40° C.—including all temperatures and sub-ranges there-between. In a preferred embodiment, the binder may have a Tg that ranges from about 25° C. to about 35° C. including all temperatures and sub-ranges there-between.

It has been discovered that the pigment composition of the present invention provides improved color and light reflectance to the resulting surface coating 200. Specifically, the addition of the clay of the present invention allows for a reduction in relative amounts of titanium dioxide in the resulting coating composition without a corresponding decrease in white color values and light reflectance performance. It has also been discovered that the addition of the clay component allows for the face coatings 200 to be formulated with less calcium carbonate—further providing a cost savings to the user and resulting in a coating composition having a pH value that is closer to neutral.

Non-limiting examples of the binder include polymers selected from polyvinyl alcohol (PVOH), latex, an acrylic polymer, polymaleic anhydride, or a combination of two or more thereof. Non-limiting examples of latex binder may include a homopolymer or copolymer formed from the following monomers: vinyl acetate (i.e., polyvinyl acetate), vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder is selected from the group consisting of aqueous lattices of polyvinyl acetate, polyvinyl acrylic, polyurethane, polyurethane acrylic, polystyrene acrylic, epoxy, polyethylene vinyl chloride, polyvinylidene chloride, and polyvinyl chloride.

In a non-liming embodiment, the binder may be a polymeric composition that is formed by curing an alkyd resin (also referred to as an alkyd emulsion). Non-limiting examples of alkyd emulsion include polyester resins which include residues of polybasic, usually di-basic, acid(s) and polyhydroxy, usually tri- or higher hydroxy alcohols and further including monobasic fatty acid residues. The monobasic residues may be derived (directly or indirectly) from oils (fatty acid triglycerides) and alkyd resins are also referred to as oil modified polyester resins.

The alkyd resins may be cured from residual carboxyl and hydroxyl functionality or by unsaturation (often multiple unsaturation) in the monobasic fatty acid residues. Alkyd resins may include other residues and/or additives to provide specific functionality for the intended end use e.g. sources of additional carboxyl groups may be included to improve water compatibility. One or more catalyst may be blended with an alkyd resin to help accelerate curing.

Alkyd resins may be prepared by reacting a monobasic fatty acid, fatty ester or naturally occurring, partially saponified oil with a glycol or polyol and/or a polycarboxylic acid.

Non-limiting examples of monobasic fatty acid, fatty ester or naturally occurring-partially saponified oil may be prepared by reacting a fatty acid or oil with a polyol. Examples of suitable oils include sunflower oil, canola oil, dehydrated castor oil, coconut oil, corn oil, cottonseed oil, fish oil, linseed oil, oiticica oil, soya oil, and tung oil, animal grease, castor oil, lard, palm kernel oil, peanut oil, perilla oil, safflower, tallow oil, walnut oil. Suitable examples of the fatty acid components of oil or fatty acids by themselves are selected from the following oil derived fatty acids; tallow acid, linoleic acid, linolenic acid, oleic acid, soya acid, myristic acid, linseed acid, crotonic acid, versatic acid, coconut acid, tall oil fatty acid, rosin acid, neodecanoic, neopentanoic, isostearic, 12-hydroxystearic, cottonseed acid with linoleic, linolenic and oleic being more preferred Non-limiting examples of suitable glycol or polyol include aliphatic, alicyclic, and aryl alkyl glycols. Suitable examples of glycols include: ethylene glycol; propylene glycol; diethylene glycol; triethylene glycol; tetraethylene glycol; pentaethylene glycol; hexaethylene glycol; heptaethylene glycol; octaethylene glycol; nonaethylene glycol; decaethylene glycol; 1,3-propanediol; 2,4-dimethyl-2-ethyl-hexane-1,3-diol; 2,2-dimethyl-1,2-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-tetramethyl-1,6-hexanediol; thiodiethanol; 1,2-cyclohexanedimethanol; 1,3-cyclohexanedimethanol; 1,4-cyclohexanedimethanol; 2,2,4-trimethyl-1,3-pentanediol; 2,2,4-tetramethyl-1,3-cyclobutanediol; p-xylenediol hydroxypivalyl hydroxypivalate; 1,10-decanediol; hydrogenated bisphenol A; trimethylolpropane; trimethylolethane; pentaerythritol; erythritol; threitol; dipentaerythritol; sorbitol; glycerine; trimellitic anhydride; pyromellitic dianhydride; dimethylolpropicnic acid and the like.

Non-limiting examples of polycarboxylic acid include isophthalic acid, terephthalic acid, phthalic anhydride(acid), adipic acid, tetrachlorophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride(acid), 2,6-naphthalenedicarboxylic acid, glutaric acid and esters thereof.

The binder may be present in an amount ranging from about 3.0 wt. % to about 10.0 wt. % based on the total weight of the coating composition in the dry-state—i.e., the surface coating 200—including all weight percentages and sub-ranges there-between. In some embodiments, the binder may be present in an amount ranging from about 4.0 wt. % to about 8.0 wt. % based on the total weight of the coating composition in the dry-state—i.e., the surface coating 200—including all weight percentages and sub-ranges there-between.

The binder may be present in an amount ranging from about 2.0 wt. % to about 8.0 wt. % based on the total weight of the coating composition in the wet-state—including all weight percentages and sub-ranges there-between. In some embodiments, the binder may be present in an amount ranging from about 3.0 wt. % to about 6.0 wt. % based on the total weight of the coating composition in the wet-state—including all weight percentages and sub-ranges there-between.

The surface coating 200 may comprise one or more additives. Additives may be present in the coating composition in an amount ranging from about 0.05 to about 2.5 wt. %—based on the total weight of the coating composition in the wet-state. Non-limiting examples of additives include surfactants, thickeners, emulsifiers, wetting agents, defoamers, preservatives, anti-bacterial agents, and the like.

Surfactants may be ionic, non-ionic, or combinations of ionic and non-ionic surfactant. Ionic surfactants may include anionic surfactant. Surfactants may be present in an amount ranging from about 0.01 wt. % to about 0.15 wt. % based on the weight of the surface coating 200 in the dry-state.

Thickeners may include cellulose-based compounds, such as hydroxyethyl cellulose. Thickeners may be present in an amount ranging from about 0.01 wt. % to about 0.05 wt. % based on the weight of the surface coating 200 in the dry-state.

Wetting agents may include non-ionic ethoxylates. Wetting agents may be present in an amount ranging from about 0.1 wt. % to about 0.25 wt. % based on the weight of the surface coating 200 in the dry-state.

Defoamers may include polyether siloxane. Defoamers may be present in an amount ranging from about 0.01 wt. % to about 0.05 wt. % based on the weight of the surface coating 200 in the dry-state.

Preservatives may include propiconazole. Preservatives may be present in an amount ranging from about 0.01 wt. % to about 0.07 wt. % based on the weight of the surface coating 200 in the dry-state.

The coating composition may further include diatomaceous earth. The diatomaceous earth may be present in an amount ranging from about 5.0 wt. % to about 15.0 wt. % based on the weight of the surface coating 200 in the dry-state. The diatomaceous earth may be present in an amount ranging from about 2.0 wt. % to about 8.0 wt. % based on the weight of the surface coating 200 in the wet-state.

The coating composition may further include mica. The mica may be present in an amount ranging from about 3.0 wt. % to about 7.0 wt. % based on the weight of the surface coating 200 in the dry-state. The diatomaceous earth may be present in an amount ranging from about 1.0 wt. % to about 5.0 wt. % based on the weight of the surface coating 200 in the wet-state.

The coating composition may further alumina trihydroxide. The alumina trihydroxide may be present in an amount ranging from about 5.0 wt. % to about 15.0 wt. % based on the weight of the surface coating 200 in the dry-state. The alumina trihydroxide may be present in an amount ranging from about 2.0 wt. % to about 8.0 wt. % based on the weight of the surface coating 200 in the wet-state.

The building panel 10 according to the present invention may be formed by applying the coating composition in the wet-state to either the body 100 or the scrim in an amount ranging from about 100 g/m² to about 450 g/m²—including all amounts and sub-ranges there-between. Once applied, the coating composition in the wet-state may be dried at a temperature ranging from about 90° C. to about 315° C. including all temperatures and sub-ranges there-between.

The coating composition may be applied by spray, roll, or vacuum coating.

After drying, all liquid carrier is driven off thereby leaving the surface coating 200 i.e., the coating composition in the dry-state. The surface coating 200 may be present in an amount ranging from about 55 g/m² to about 360 g/m² including all amounts and sub-ranges there-between.

The surface coating 200 may comprise an outer surface 201 opposite an inner surface 202. The inner surface 202 of the surface coating 200 faces toward the body 100 while the outer surface 201 of the surface coating 200 faces away from the body 100. The surface coating 200 may have a surface coating thickness $t_2$ as measured from the outer surface 201 to the inner surface 202 of the surface coating 200.

The surface coating 200 may comprise a topcoat 210. The topcoat 210 may comprise an outer surface 211 opposite an inner surface 212. The topcoat 210 may have a topcoat thickness $t_3$ as measured between the inner surface 212 and the outer surface 211 of the topcoat 210.

The topcoat 210 may be applied to the upper surface 111 of the body 100 or the first major surface of the scrim. Once applied, the inner surface 212 of the topcoat 210 faces the upper surface 111 of the body 100 or the first major surface of the scrim, and the outer surface 211 of the topcoat 210 forms the first major exposed surface 11 of the building panel 10. Stated otherwise, the first major exposed surface 11 of the building panel 10 may comprises the outer surface 211 of the topcoat 210.

The topcoat 210 may be present in an amount ranging from about 55 g/m² to about 360 g/m²—including all amounts and sub-ranges there-between.

The surface coating 200 may comprise an edge-coat 230. The edge-coat 230 may comprise an outer surface 231 opposite an inner surface 232. The edge-coat 210 may have a edge-coat thickness t4 as measured between the inner surface 232 and the outer surface 231 of the edge-coat 230.

The edge-coat 230 may be applied to the body side surface 113 of the body 100. Once applied, the inner surface 232 of the edge-coat 230 faces the body side surface 113 of the body 100 and the outer surface 231 of the edge-coat 230 forms the side exposed surface 13 of the building panel 10. Stated otherwise, the side exposed surface 13 of the building panel 10 may comprise the outer surface 231 of the edge-coat 230.

The edge-coat 230 may be present in an amount ranging from about 5 g/m to about 100 g/m—including all amounts and sub-ranges there-between.

Although the building panel 10 shown in FIGS. 1 and 2 include both the topcoat 210 and the edge-coat 230, the present invention is not limited to surface coatings 200 that include both the topcoat 210 and the edge-coat 230. In some embodiments, the building panel 10 may comprise a surface coating 200 that includes only the topcoat 210—whereby the side exposed surface 13 of the building panel 10 is formed by the body side surface 113 of the body 100. In other embodiments, the building panel 10 may comprise a surface coating 200 that includes only the edge-coat 230—whereby first major exposed surface 11 of the building panel 10 is formed by either the upper surface 111 of the body 100, the first major surface of the scrim, or a coating applied thereto that is different from the surface coating 200 of the present invention.

EXAMPLES

Experiment 1—Face Coating

An experiment was performed to test the impact on color and appearance of the pigment composition according to the present invention. The experiment included a number of coating composition formulations applied to a major surface of a panel body and dried. After each coating is dried, the color and gloss values of each coating were measured. The formulation and test results are set forth below in Table 1.

Liquid Carrier—includes water

Binder—polyvinyl acetate homopolymer having a pH of about 7.0 and a Tg of about 37° C.

Additive blend of various surfactants, anti-foaming agents, and wetting agents

TABLE 1

|  | Comp. Ex. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Liquid Carrier | 23.9 | 27.2 | 27.2 | 27.4 | 27.5 | 27.2 | 27.4 | 27.4 | 27.3 | 27.0 |
| Binder | 4.8 | 4.8 | 4.8 | 4.8 | 4.8 | 4.8 | 4.7 | 4.7 | 4.7 | 4.7 |
| TiO₂ | 9.3 | 4.8 | 4.5 | 4.0 | 3.6 | 4.5 | 4.1 | 3.6 | 3.2 | 3.6 |
| Sodium Alum. Silicate | — | — | 0.5 | 1.0 | 1.5 | 0.5 | 0.5 | 1.0 | 1.5 | 2.5 |
| Calcined Kaolin | — | 11.9 | 14.1 | 14.1 | 14.0 | 14.2 | 12.0 | 12.0 | 12.0 | 10.8 |
| CaCO₃ | 52.7 | 41.9 | 39.4 | 39.2 | 39.1 | 39.4 | 43.1 | 43.1 | 43.1 | 43.1 |
| MgCO₃ | 9.1 | 9.0 | 9.1 | 9.1 | 9.1 | 9.1 | 8.0 | 8.0 | 8.0 | 8.0 |
| Additive | 0.2 | 0.4 | 0.4 | 0.4 | 0.4 | 0.3 | 1.0 | 1.0 | 1.0 | 1.0 |
| pH | 8.6 | 7.9 | 8.0 | 8.0 | 8.2 | 8.1 | 8.1 | 8.2 | 8.3 | 8.5 |
| White Color Values |  |  |  |  |  |  |  |  |  |  |
| L | 97.16 | 96.99 | 96.92 | 96.98 | 97.05 | 97.06 | 97.1 | 97.1 | 97.0 | 97.2 |
| a | −0.59 | −0.61 | −0.61 | −0.57 | −0.57 | −0.59 | −0.59 | −0.57 | −0.56 | −0.55 |
| b | 1.75 | 2.22 | 2.08 | 2.21 | 2.05 | 2.32 | 2.06 | 2.06 | 1.98 | 2.01 |
| LR | 92.82 | 92.42 | 92.25 | 92.4 | 92.57 | 92.59 | 92.59 | 92.78 | 92.47 | 92.92 |

TABLE 1-continued

| | Comp. Ex. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Gloss | | | | | | | | | | |
| 20° | 1.4 | 1.4 | 1.4 | 1.4 | 1.4 | 1.4 | 1.4 | 1.4 | 1.4 | 1.4 |
| 60° | 2.7 | 2.6 | 2.9 | 2.8 | 2.8 | 2.7 | 2.7 | 2.7 | 2.8 | 2.9 |

As demonstrated by Table 1, the addition of calcined kaolin to the coating formulation provides an unexpected enhancement to the desired coating performance in that the coating composition of the present invention can achieve the desired color and reflectance values with almost a 50% reduction in the amount of titanium dioxide as well as over a 20% reduction in the amount of calcium carbonate. Therefore, not only does the new formulation provide a cost savings in that less raw material is required to produce a satisfactory coating, but such coatings also have a reduced solids content, thereby facilitating application of the coating.

As demonstrated by Examples 2-5, it has also been discovered that the addition of alkali metal silicate provides a further unexpected enhancement in that even less titanium dioxide and calcium carbonate may be used to produce coatings having the desired color and light reflective values. Therefore, the newly discovered combination of calcined kaolin with alkali metal silicate—specifically sodium aluminum silicate—provides a cost-savings alternative to coating formulations that otherwise require relatively large amounts of titanium dioxide and calcium carbonate. As demonstrated by Examples 6-9, the desirable whitening color values and light reflectance values can further be maintained at even lower amounts of $TiO_2$ when the alkali metal silicate is present in an amount ranging between 0.5 wt. % and 2.5 wt. % and used in combination with calcined kaolin and there is a slight increase in the amount of calcium carbonate in the pigment composition.

Experiment 2—Face Coating

An experiment was performed to test the impact on color and appearance of the pigment composition according to the present invention. The experiment included a number of coating composition formulations applied to a side surface of a panel body and dried. After each coating is dried, the color and gloss values of each coating were measured. The formulation and test results are set forth below in Table 2.

Liquid Carrier—includes water

Binder—vinyl acrylic latex having a pH of about 5.0 and a Tg of about 19° C.

Additive blend of various surfactants, anti-foaming agents, anti-bacterial agent, and emulsifier.

TABLE 2

| | Comp. Ex. 2 | Ex. 10 | Ex. 11 |
|---|---|---|---|
| Liquid Carrier | 39.4 | 42.4 | 42.3 |
| Binder | 13.3 | 13.9 | 13.9 |
| $TiO_2$ | 7.3 | 5.2 | 4.5 |
| Sodium Alum. Silicate | — | — | 0.7 |
| Kaolin | — | 5.9 | 5.0 |
| $CaCO_3$ | 17.6 | 18.0 | 19.0 |
| Diatomaceous Earth | 4.7 | 4.9 | 4.9 |
| Alumina Trihydrate | 12.1 | 5.3 | 5.3 |
| Mica | 3.5 | 3.7 | 3.7 |
| Anti-Settling Agent | 1.0 | — | — |

TABLE 2-continued

| | Comp. Ex. 2 | Ex. 10 | Ex. 11 |
|---|---|---|---|
| Additive | 1.1 | 0.7 | 0.7 |
| pH | 7.15 | 6.98 | 7.09 |
| White Color Values | | | |
| L | 94.2 | 94.2 | 94.0 |
| a | −0.84 | −0.83 | −0.82 |
| b | 2.04 | 2.41 | 2.35 |
| LR | 85.07 | 85.63 | 85.29 |
| Gloss | | | |
| 20° | 1.2 | 1.3 | 1.2 |
| 60° | 2.0 | 2.0 | 2.0 |
| 85° | 0.6 | 0.5 | 0.5 |

As demonstrated by Table 2—Example 10, the addition of calcined kaolin to the edge coating provides an unexpected enhancement to the desired coating performance in that the desired color and reflectance values can be achieved with an overall reduction in the amount of titanium dioxide. Therefore, the new formulation provides a cost savings in that less raw $TiO_2$ is required to produce a satisfactory coating.

As demonstrated by Example 11, it has also been discovered that the addition of alkali metal silicate provides a further unexpected enhancement in that even less titanium dioxide may be used to produce edge coatings having the desired color and light reflective values. Therefore, the newly discovered combination of calcined kaolin with alkali metal silicate—specifically sodium aluminum silicate—provides a cost-savings alternative to coating formulations that otherwise require relatively large amounts of titanium dioxide and calcium carbonate.

What is claimed is:

1. A coating composition comprising:
   a liquid carrier;
   a binder; and
   a pigment composition comprising:
      titanium dioxide;
      an alkali metal silicate;
      a clay; and
      one or more alkaline earth metal carbonates comprising magnesium carbonate and calcium carbonate;
      wherein the one or more alkaline earth metal carbonates is present in an amount ranging from about 60.0 wt. % to about 80.0 wt. % based on the total weight of the pigment composition; and
      wherein the calcium carbonate and the magnesium carbonate are present in a weight ratio ranging from about 3:1 to about 6:1.

2. The coating composition according to claim 1, wherein the pigment composition is present in an amount ranging from about 55.0 wt. % to about 80.0 wt. % based on the total weight of the coating composition.

3. The coating composition according to claim 1, wherein the alkali metal silicate is sodium aluminum silicate.

4. The coating composition according to claim 1, wherein the binder is a vinyl acetate polymer.

5. The coating composition according to claim 1, wherein the binder is present in an amount ranging from about 2.0 wt. % to about 8.0 wt. % based on the total weight of the coating composition.

6. The coating composition according to claim 1, wherein the coating composition has a solids content ranging from about 50% to about 85%.

7. The coating composition according to claim 1, wherein the liquid carrier comprises water.

\* \* \* \* \*